United States Patent [19]

Kaneda et al.

[11] 4,230,168

[45] Oct. 28, 1980

[54] POLYURETHANE TIRE FILLING MATERIAL WITH PLASTICIZER INCORPORATED THEREIN

[75] Inventors: Hiroshi Kaneda, Murayama; Yoji Watabe, Akikawa; Akio Souma, Murayama; Yasuyuki Ura; Michio Ishii, both of Kodaira; Shiro Anzai, Murayama, all of Japan

[73] Assignee: Bridgestone Tire Co., Ltd., Tokyo, Japan

[21] Appl. No.: 955,503

[22] Filed: Oct. 27, 1978

[30] Foreign Application Priority Data

Nov. 7, 1977 [JP] Japan ............................... 52/132587

[51] Int. Cl.$^3$ ..................... B60C 17/00; B60C 1/00; C08K 5/02; C08K 5/10
[52] U.S. Cl. ............................. 152/310; 152/330 RF; 260/31.8 N; 260/33.8 UB
[58] Field of Search ............... 152/152, 157, 246, 310, 152/311, 312, 313, 330 R, 330 RF, 330 L, 346, 347; 260/31.8 R, 31.8 N, 33.8 UB; 528/52

[56] References Cited

U.S. PATENT DOCUMENTS

| Re. 29,890 | 1/1979 | Gomberg | 152/313 |
| 3,102,875 | 9/1963 | Heiss | 260/33.8 UB |
| 3,378,511 | 4/1968 | Nenton | 260/31.8 N |
| 3,440,224 | 4/1969 | Impola et al. | 260/31.8 N |
| 3,605,848 | 9/1971 | Lombardi et al. | 152/310 |
| 3,701,374 | 10/1972 | McGillvary | 152/330 R |
| 3,849,349 | 11/1974 | Frisch et al. | 528/52 |
| 3,866,651 | 2/1975 | Gomberg | 152/313 |
| 3,883,465 | 5/1975 | Olstowski | 260/33.8 UB |
| 4,071,279 | 1/1978 | Chung | 260/31.2 N |
| 4,095,637 | 6/1978 | Krishnan | 152/357 A X |
| 4,125,691 | 11/1978 | White | 152/310 |

OTHER PUBLICATIONS

"Versatile Millables Debut in Urethane Market", Rubber World, vol. 160, #5, Aug. 1969, pp. 52-53.

Primary Examiner—John T. Goolkasian
Assistant Examiner—Lois E. Rodgers
Attorney, Agent, or Firm—Brooks, Haidt, Haffner & Delahunty

[57] ABSTRACT

Tire filling material having high resilience produced by curing a mixture of
 (a) a polyoxypropylene polyol having an OH equivalent molecular weight of 900–1,800 and a functionality of 2–4,
 (b) a polyisocyanate, and
 (c) a plasticizer
in the presence of a catalyst where the equivalent ratio (NCO/OH) of isocyanate groups in component (b) to hydroxyl groups in component (a) is from 0.8–2.0 and the amount of component (c) is 10–200 parts by weight per 100 parts by weight of component (a).

6 Claims, No Drawings

POLYURETHANE TIRE FILLING MATERIAL WITH PLASTICIZER INCORPORATED THEREIN

BACKGROUND OF THE INVENTION

1. Field of the Invention

This invention relates to a tire filling material having high resilience.

2. Description of the Prior Art

Heretofore, there have been proposed various methods or materials for avoiding the danger of puncture of tires during running. Among them, a tire filled with an elastomeric material is advantageous since it is puncture proof and control of the inner pressure is not necessary.

As tire filling materials, foamed elastomeric materials such as those disclosed in U.S. Pat. No. 3,605,848 and the like have been mainly used, but exothermicity of the materials upon running is so large that the materials are not always satisfactory. Another example of tire filling materials is polyurethane elastomer which has high resilience and thereby shows low exothermicity, but the riding comfort of a tire filled with polyurethane elastomer is poorer than that of a pneumatic tire.

Riding comfort can be improved by lowering hardness of the filling material, but when the hardness is lowered by decreasing the equivalent ratio of isocyanate groups to hydroxyl groups, the resilience is disadvantageously lowered.

SUMMARY OF THE INVENTION

An object of the present invention is to provide a tire filling material having high resilience and low hardness through a plasticizer incorporated therein.

Another object of the present invention is to provide a tire filling material capable of providing a tire having low radial stiffness and an improved riding comfort.

A further object of the present invention is to provide a tire filling material of which hardness can be optionally adjusted by changing the amount of the plasticizer incorporated.

Still another object of the present invention is to provide a tire filling material having desired resilience and hardness.

A still further object of the present invention is to provide a tire filling material capable of being filled in a tire efficiently by using a filling device of a two-liquid mixing type.

According to the present invention, the resilience can be varied by changing the combination of the polyol and the isocyanate.

A filling device of a two-liquid mixing type works most efficiently where the volume ratio of two liquids is 1:1. Since the molecular weight of an isocyanate component is generally less than the polyol component, the volume ratio is usually far deviated from 1:1, but according to the present invention it is possible to make the volume ratio near to 1:1 by incorporating a plasticizer and thereby an efficient mixing is possible.

According to the present invention, there is provided a tire filling material having high resilience produced by curing a mixture of (a) a polyoxypropylene polyol having an OH equivalent molecular weight of 900–1,800 and a functionality of 2–4,
(b) a polyisocyanate, and
(c) a plasticizer in the presence of a catalyst where the equivalent ratio (NCO/OH) of isocyanate groups in component (b) to hydroxyl groups in component (a) is from 0.8–2.0 and the amount of component (c) is 10–200 parts by weight per 100 parts by weight of component (a).

DESCRIPTION OF THE PREFERRED EMBODIMENT

The term "OH equivalent molecular weight" means the molecular weight of the polyol divided by the number of hydroxyl (OH) groups.

The polyols, component (a), used in the present invention are polyoxypropylene polyols or polyoxypropylene polyols having ethylene oxides added to the terminals, having usually an OH equivalent molecular weight of 900–1,800, preferably 1,000–1,700, and a functionality of 2–4. Where the OH equivalent molecular weight is lower than 900 or higher than 1,800, resilience of the tire filling material is poor. Where the functionality is less than 2, curing is difficult and where functionality is more than 4, the elastomer becomes brittle.

Polyoxypropylene polyols having ethylene oxide addition-polymerized to the ends have advantageously a higher heat resistance than polyoxypropylene polyols without ethylene oxide addition-polymerized.

The amount of added ethylene oxide is in practice 5–30% by weight based on the polyoxypropylene polyol having ethylene oxide addition-polymerized to the terminals.

Polyols satisfying the above mentioned conditions may be used alone or in combination.

Polyisocyanates which may be used as component (b) in this invention include aliphatic polyisocyanates such as tetramethylene-1,4-diisocyanate, hexamethylene-1,6-diisocyanate, 1,3- and 1,4-xylenediisocyanate and the like; alicyclic polyisocyanates such as $\omega,\omega'$-diisocyanate-1,2-dimethylcyclohexane, 1-methylcyclohexane-2,4- and 2,6-diisocyanate, 1,3- and 1,4-cyclohexyl diisocyanate, methylene bis(4-cyclohexyl isocyanate), isophorone diisocyanate and the like; aromatic polyisocyanates such as 2,4- and 2,6-tolylene diisocyanate, 5-chloro-2,4-tolylene diisocyanate, diphenyl-4,4'-diisocyanate, meta and para-phenylene diisocyanate, 1,4-, 1,5-, 2,6- and 2,7-naphthalene diisocyanate, diphenylmethane-4,4'-diisocyanate, diphenyl dimethylmethane-4,4'-diisocyanate, diphenylether-4,4' diisocyanate, 3,3'-dimethyl diphenyl-4,4'-diisocyanate, a polymethylene polyphenyl polyisocyanate having the following formula

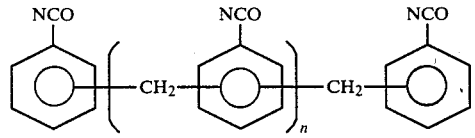

wherein n=0–5, and the like.

Among them, diphenylmethane-4,4'-diisocyanate, the polymethylene polyphenyl polyisocyanate and 2,4- or 2,6-tolylene diisocyanate or mixtures thereof are preferable.

According to the present invention, an equivalent ratio (NCO/OH) of isocyanate groups in the polyisocyanate to hydroxyl groups in the polyoxypropylene polyol is selected to be 0.8–2.0, preferably 1.0–2.0. Where the equivalent ratio is less than 0.8, exothermicity of the tire filling material is undesirably high, and where the equivalent ratio is higher than 2.0, the hardness is disadvantageously high.

Plasticizers used in the present invention [component (c)] are plasticizers miscible with the polyoxypropylene polyol [component (a)], for example, chlorinated paraffin, dialkyl phthalates such as dioctyl phthalate and the like, and esters of aliphatic dibasic acids such as dibutyl diglycol adipate, diisodecyl succinates, diisodecyl adipate, dioctyl azelate, dibutyl sebacate, dioctyl sebacate and the like.

Among them, chlorinated paraffin and dialkyl phthalates are preferable.

The amount of the plasticizer used in the present invention is 10–200 parts by weight per 100 parts by weight of the polyol [component (a)]. Where the amount of the plasticizer is less than 10 parts by weight, hardness of the elastomer hardly decreases so that the incorporation of the plasticizer has substantially no effect. On the contrary, where an amount of the plasticizer is more than 200 parts by weight, the plasticizer disadvantageously oozes out of the elastomer.

As a catalyst according to the present invention, there may be used urethane catalysts where NCO/OH does not exceed 1, and further there may be used trimerization catalysts for isocyanates over the whole range of NCO/OH.

Representative urethane catalysts are 1,4-diazabicyclo-(2,2,2)-octane, N,N-dimethylcyclohexylamine, N-methyldicyclohexylamine, N,N,N',N'-tetramethylpropylene diamine, N,N,N',N'-tetramethylhexamethylene diamine, N-ethylmorpholine, N-methylmorpholine, N,N-dimethylethanol amine, N,N-diethylethanol amine, 1,8-diaza-bicyclo[5,4,0]-undecene-7 and its salts, stannous octoate, dibutyl tin dilaurate and the like.

Representative isocyanate trimerization catalysts are triethylamine, tri-n-butylamine, N,N,N',N'-tetramethyl-1,3-butane-diamine, 1,4-diaza[2,2,2]-bicyclooctane, N-ethylmorpholine, 2,4,6-tris(diaminomethyl)phenol, N,N-dimethylbenzylamine, N,N-dimethylcyclohexylamine, N,N',N''-tris(dimethylaminopropyl)-hexahydro-S-triazine, 1,8-diaza-bicyclo[5,4,0]undecene-7 (hereinafter referred to as "DBU"), phenol salt, hexanoate, and oleate of DBU and alkali metal salts of carboxylic acids. Among them, 2,4,6-tris(dimethylaminomethyl) phenol is preferable.

In the above enumeration of compounds, some compounds are mentioned in both the urethane catalyst and the trimerization catalyst. This means that the compounds are effective in both the urethanation reaction and the trimerization reaction to the same extent. The trimerization catalysts are effective for urethanation reactions to some extent, but are more effective for trimerization reactions than for urethanation reactions.

An amount of the catalyst may be selected optionally depending upon the desired pot life and curing efficiency, and is preferably 0.01–2.0 parts by weight per 100 parts by weight of the polyol. When the amount of the catalyst is less than 0.01 part by weight, the curing reaction completes with difficulty and when the amount is more than 2.0 parts by weight, the pot life is so short that the filling operation can not be easily carried out.

Curing reaction of the mixture according to the present invention can be completed at any temperature between 10° and 150° C., but a temperature between 10° and 100° C. is preferable since the curing should be carried out inside a tire.

Filling a tire with the mixture may be effected by pumping the mixture into a tire and wheel assembly through a valve hole in the rim, and then curing is carried out at the above mentioned temperature range for a certain time.

The present invention will be further explained by Examples and comparison examples as shown below.

In the examples, the items used to evaluate the elastomers include JIS hardness and resilience. Resilience is measured by Dunlop-Resilience Tester and calculated by using the following equation:

$$\text{Resilience (\%)} = \frac{1 - \cos\theta}{1 - \cos 40°} \times 100$$

where $\theta$ is a bouncing angle. Parts are by weight in the following examples.

EXAMPLE 1

100 parts of polyoxypropylene tetrol having an OH equivalent molecular weight of 1430 and containing 10% by weight of ethylene oxide addition-polymerized to the terminals, 0.16 parts of 2,4,6-tris(diemthylaminomethyl) phenol (hereinafter referred to as "DMP") and 113 parts of chlorinated paraffin ("Toyoparax 150", tradename, chlorine content of 50%, supplied by Toyo Soda Kogyo K.K., Japan) were sufficiently mixed. To the resulting mixture was added 9.60 parts of polymethylene polyphenyl polyisocyanate (NCO content of 30.6%) which corresponds to NCO/OH of 1.0, and thoroughly stirred at room temperature. The resulting mixture was poured into a slab mold of 2 mm in thickness and cured at 70° C. for 22 hours. The product was measured with respect to JIS hardness and resilience. The result is shown in Table 1.

COMPARISON EXAMPLES 1–3

Samples were prepared by repeating the procedures of Example 1 except that there were used polyoxypropylene tetrols having an OH equivalent molecular weight of 1430, 2010 and 2520, respectively, in place of the polyoxypropylene tetrol containing an addition-polymerized ethylene oxide and there was not used a chlorinated paraffin. Table 1 shows JIS hardness and resilience of the resulting samples.

TABLE 1

| | OH equivalent molecular weight | Amount of chlorinated paraffin (parts) | JIS hardness (degree) | Resilience (%) |
|---|---|---|---|---|
| Example 1 | 1430 | 113 | 22 | 90.6 |
| Comparison Example 1 | 1430 | 0 | 44 | 92.4 |
| Comparison Example 2 | 2010 | 0 | 33 | 84.7 |
| Comparison Example 3 | 2520 | 0 | 24 | 78.8 |

As is clear from Table 1, the sample of Comparison Example 1 shows a high resilience, but where a polyol of a high OH equivalent molecular weight was used so as to lower hardness of the material (Comparison Examples 2 and 3), resilience is lowered. However, where a plasticizer (chlorinated paraffin as in Example 1) is used in place of varying an OH equivalent molecular weight, the resulting material has a low hardness and a high resilience.

EXAMPLE 2

A mixture according to Example 1 was pressed into an LSR 8.25-16 (size) tire at a filling pressure of 3.5 Kg/cm$^2$ at 70° C. for 4 days.

For the purpose of enhancing the filling efficiency, a liquid mixture of a polyol and DMP and a liquid mixture of chlorinated paraffin and polymethylene polyphenyl polyisocyanate prepared preliminarily were pressed into the tire by using a filling machine of a two-liquid mixing type. Volumes of the two liquid mixtures were the same.

As is clear from above, using a plasticizer such as chlorinated paraffin results in filling of a high working efficiency and productivity of filled tires is improved to a great extent.

The resulting tire has improved riding comfort since hardness of the filling material is lowered.

EXAMPLES 3–7 AND COMPARISON EXAMPLES 4–7

Repeating the procedures of Example 1 except that NCO/OH varied from 0.7 to 2.5 and an amount of the chlorinated paraffin varied from 10 to 200 parts so as to adjust JIS hardness, cured materials were produced. In the above procedures, when NCO/OH was large, the curing time was prolonged.

Samples thus produced were measured with respect to a JIS hardness and resilience, and the results are shown in Table 2 below.

TABLE 2

|  | NCO/OH | Chlorinated paraffin (parts) | JIS hardness (degrees) | Resilience (%) |
|---|---|---|---|---|
| Example 3 | 0.8 | 10 | 28 | 87.4 |
| Example 4 | 0.9 | 50 | 28 | 90.6 |
| Example 5 | 1.3 | 169 | 23 | 90.6 |
| Example 6 | 1.7 | 170 | 30 | 91.5 |
| Example 7 | 2.0 | 200 | 24 | 86.5 |
| Comparison Example 4 | 0.7 | 20 | 18 | 82.5 |
| Comparison Example 5 | 0.8 | 0 | 33 | 90.6 |
| Comparison Example 6 | 2.5 | 50 | Not Cured | |
| Comparison Example 7 | 1.7 | 250 | 15 | 88.8 |

As is clear from Table 2, it is possible to lower hardness while the lowering of resilience is suppressed, by incorporating a plasticizer in a range of NCO/OH of from 0.8 to 2.0. Where NCO/OH is 0.7 (Comparison Example 4), resilience is low while a material is not cured at NCO/OH of 2.5 (Comparison Example 6). Even when an amount of the chlorinated paraffin exceeds 200 parts, a material of a high resilience and a low hardness is produced, but the plasticizer oozes out of the cured material. Therefore, this material is not suitable for a tire filling material.

EXAMPLE 8

Repeating the procedures of Example 1 except that 80 parts of dioctyl phthalate was used in place of chlorinated paraffin, the resulting cured material had a JIS hardness of 31° and a resilience of 92.4%, that is, a low hardness and a high resilience.

EXAMPLES 9–10 AND COMPARISON EXAMPLES 8–9

Repeating the procedures of Example 1 except that the OH equivalent molecular weight, the content of addition-polymerized ethylene oxide, and the functionality of the polyoxypropylene polyol were varied and 30–75 parts of the chlorinated paraffin was added so as to adjust the JIS hardness as shown in Table 3 below, the results are shown in Table 3.

TABLE 3

|  | OH equivalent molecular weight | Amount of addition-polymerized ethylene oxide (%) | Functionality | Chlorinated paraffin (parts) | JIS hardness (degree) | Resilience (%) |
|---|---|---|---|---|---|---|
| Example 9 | 1080 | 13 | 4 | 75 | 25 | 90.6 |
| Example 10 | 1700 | 25 | 4 | 35 | 25 | 90.6 |
| Comparative Example 8 | 780 | 13 | 3 | 50 | 25 | 80.7 |
| Comparative Example 9 | 2010 | 10 | 4 | 30 | 23 | 85.2 |

It is clear from Table 3 that an OH equivalent molecular weight capable of giving a low hardness and a high resilience is in the range of from 900 to 1,800.

EXAMPLE 11

Repeating the procedures of Example 1 except that a mixture of 2,4- and 2,6-tolylene diisocyanates (containing about 80% 2,4-tolylene diisocyanate) was used in an amount corresponding to NCO/OH=1.45 and 90 parts of the chlorinated paraffin was used in place of polymethylene polyphenyl polyisocyanate and 113 parts of the chlorinated paraffin, the resulting cured material had a JIS hardness of 24° and a resilience of 89.7%, that is, a low JIS hardness and a high resilience.

What is claimed is:

1. A tire filled with elastomeric material having high resilience, the material being produced by curing a mixture of
   (a) a polyoxypropylene polyol having an OH equivalent molecular weight of 900–1,800 and a functionality of 2–4,
   (b) a polyisocyanate, and
   (c) a chlorinated paraffin or dialkyl phthalate plasticizer miscible with the polyoxypropylene polyol in the presence of a catalyst where the equivalent ratio (NCO/OH) of isocyanate groups in the component (b) to hydroxyl groups in the component (a) is from 0.8–2.0 and the amount of the component (c) is 10–200 parts by weight per 100 parts by weight of the component (a).

2. A tire according to claim 1 in which the polyoxypropylene polyol is a polyoxypropylene polyol having ethylene oxide addition-polymerized to the terminals.

3. A tire according to claim 2 in which the amount of ethylene oxide addition-polymerized is 5–30% by weight based on the polyoxypropylene polyol having ethylene oxide addition-polymerized to the terminals.

4. A tire according to claim 1 in which the polyisocyanate is a member selected from the group consisting of diphenylmethane-4,4'-diisocyanate, polymethylene polyphenyl polyisocyanate, 2,4- and 2,6-tolylene diisocyanate.

5. A tire according to claim 1 in which the dialkyl phthalate is dioctyl phthalate.

6. A tire according to claim 1 in which the catalyst is 2,4,6-tris(dimethylaminomethyl) phenol.

* * * * *